United States Patent
Rao

(10) Patent No.: US 12,399,868 B1
(45) Date of Patent: Aug. 26, 2025

(54) MANAGED FILE COMPACTION FOR DISTRIBUTED STORAGE SYSTEMS

(71) Applicant: Amazon Technologies, Inc., Seattle, WA (US)

(72) Inventor: Pradeep Rao, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/123,687

(22) Filed: Mar. 20, 2023

(51) Int. Cl.
*G06F 16/174* (2019.01)
*G06F 16/14* (2019.01)
*G06F 16/16* (2019.01)

(52) U.S. Cl.
CPC ........ *G06F 16/1744* (2019.01); *G06F 16/144* (2019.01); *G06F 16/162* (2019.01)

(58) Field of Classification Search
CPC ... G06F 16/1744; G06F 16/144; G06F 16/162
USPC ......................................................... 707/693
See application file for complete search history.

(56) References Cited

U.S. PATENT DOCUMENTS

| | | | | |
|---|---|---|---|---|
| 9,324,367 | B1* | 4/2016 | Ku | G11B 5/012 |
| 10,853,315 | B1* | 12/2020 | Faibish | G06F 16/137 |
| 11,567,900 | B1* | 1/2023 | Mahadev | G06F 16/1734 |
| 11,758,020 | B1* | 9/2023 | Tijerina | G06F 9/485 |
| | | | | 709/238 |
| 2011/0106806 | A1* | 5/2011 | Tamas | G06F 16/1824 |
| | | | | 707/E17.089 |
| 2012/0290712 | A1* | 11/2012 | Walter | H04L 63/1416 |
| | | | | 709/224 |

(Continued)

FOREIGN PATENT DOCUMENTS

| | | | | |
|---|---|---|---|---|
| CN | 104331428 A | * | 2/2015 | ........... G06F 16/172 |
| CN | 104572670 A | * | 4/2015 | ............. G06F 16/13 |

(Continued)

OTHER PUBLICATIONS

Xiong et al., "A Small File Merging Strategy for Spatiotemporal Data in Smart Health", IEEE Access, Open Access Journal, vol. 7, 2019, pp. 14799-14806. (Year: 2019).*

Wang et al., "An Effective Strategy for Improving Small File Problem in Distributed File System", 2015 2nd International Conference on Information Science and Control Engineering, IEEE, 2015, pp. 122-126. (Year: 2015).*

(Continued)

*Primary Examiner* — Phuong Thao Cao
(74) *Attorney, Agent, or Firm* — Perilla Knox & Hildebrandt LLP; Thomas B. Hildebrandt

(57) ABSTRACT

Techniques implemented by file-compaction system that monitors storage containers in distributed storage systems, identifies small files that have been added to the storage containers, and automatically compacts the small files into larger files. Distributed file systems are well-equipped to manage large data files, but handling small files can slow the processing and analyzing of files, increase the retrieval time of files, etc. The file-compaction system monitors the storage containers to determine whether new small files have been added from data sources. Upon detecting small files that have been added to storage containers, the file compactor automatically compacts those small files into large files. By continuously identifying and compacting small files that have been added to storage containers, the file compactor provides the distributed file system with large files while minimizing the amount of time the storage containers are locked during compaction.

21 Claims, 12 Drawing Sheets

(56) References Cited

U.S. PATENT DOCUMENTS

| | | | | |
|---|---|---|---|---|
| 2014/0136571 A1* | 5/2014 | Bonvin | ............ | G06F 16/2219 707/792 |
| 2014/0188868 A1* | 7/2014 | Hunter | .................. | G06F 16/13 707/736 |
| 2014/0289426 A1* | 9/2014 | Chan | .................... | G06F 16/122 709/247 |
| 2015/0186407 A1* | 7/2015 | Xu | ...................... | G06F 16/1744 707/638 |
| 2016/0124984 A1* | 5/2016 | Ji | ........................ | G06F 16/1727 707/693 |
| 2017/0270117 A1* | 9/2017 | Chen | .................... | G06F 16/164 |
| 2018/0121127 A1* | 5/2018 | Zhang | .................... | G06F 3/061 |
| 2020/0004840 A1* | 1/2020 | Zavora | ................ | G06F 16/182 |
| 2020/0012619 A1* | 1/2020 | Gupta | ................. | G06F 16/9027 |
| 2020/0265006 A1* | 8/2020 | Ngo | ...................... | G06F 16/185 |
| 2022/0115139 A1* | 4/2022 | Paradarami | ............ | G16H 50/30 |

FOREIGN PATENT DOCUMENTS

| | | | | |
|---|---|---|---|---|
| CN | 104731921 A | * | 6/2015 | ............ G06F 16/172 |
| CN | 105630688 A | * | 6/2016 | ............ G06F 16/1727 |
| CN | 105843841 A | * | 8/2016 | ............ G06F 16/134 |
| CN | 105956183 A | * | 9/2016 | ............ G06F 16/13 |
| CN | 107066505 A | * | 8/2017 | ............ G06F 16/16 |
| CN | 107463606 A | * | 12/2017 | ............ G06F 16/113 |
| CN | 107861686 A | * | 3/2018 | ............ G06F 3/0608 |
| CN | 108460121 A | * | 8/2018 | ............ G06F 16/13 |
| CN | 109144791 A | * | 1/2019 | ............ G06F 11/1461 |
| CN | 109446165 A | * | 3/2019 | |
| CN | 110069466 A | * | 7/2019 | ............ G06F 16/13 |
| CN | 110968272 A | * | 4/2020 | ............ G06F 3/0611 |
| CN | 111159130 A | * | 5/2020 | |
| CN | 111723056 A | * | 9/2020 | |
| CN | 111913658 A | * | 11/2020 | ............ G06F 3/061 |
| CN | 111930684 A | * | 11/2020 | |
| CN | 111966647 A | * | 11/2020 | |
| CN | 107861686 B | * | 1/2021 | ............ G06F 3/0608 |
| CN | 112256650 A | * | 1/2021 | ............ G06F 16/162 |
| CN | 106547859 B | * | 2/2021 | ............ G06F 16/13 |
| CN | 112328550 A | * | 2/2021 | |
| CN | 112347055 A | * | 2/2021 | |
| CN | 112579533 A | * | 3/2021 | |
| CN | 110018997 B | * | 7/2021 | |
| CN | 113127548 A | * | 7/2021 | ............ G06F 16/254 |
| CN | 113590566 A | * | 11/2021 | |
| CN | 114443578 A | * | 5/2022 | ........ G06F 12/0253 |
| CN | 114968939 A | * | 8/2022 | |
| CN | 115586873 A | * | 1/2023 | |
| CN | 115630021 A | * | 1/2023 | |
| EP | 0533196 A2 | * | 3/1993 | ............ G06F 15/16 |
| WO | WO-2014166446 A1 | * | 10/2014 | ........ G06F 17/30091 |
| WO | WO-2018121430 A1 | * | 7/2018 | ............ G06F 16/13 |

OTHER PUBLICATIONS

Jin et al., "Managing Massive Amounts of Small Files in All Flash Storage", 2020 IEEE 44th Annual Computers, Software, and Applications Conference (COM PSAC), July 13-17, 2020, IEEE, pp. 386-393. (Year: 2020)*

* cited by examiner

500

SCHEDULER COMPONENT
210

DETECT AN EVENT INDICATING THAT THE INSPECTION COMPONENT IS TO INSPECT CONTENTS OF A FIRST STORAGE CONTAINER AND A SECOND STORAGE CONTAINER OF THE DISTRIBUTED STORAGE SYSTEM
502

INSTRUCT THE INSPECTION COMPONENT TO INSPECT THE CONTENTS OF THE FIRST AND SECOND STORAGE CONTAINERS
504

IDENTIFY A FIRST SMALL FILE THAT HAS BEEN ADDED TO THE FIRST STORAGE CONTAINER SUBSEQUENT TO A FIRST PREVIOUS TIME AT WHICH SMALL FILES IN THE FIRST STORAGE CONTAINER WERE COMPACTED INTO A FIRST COMPACTED FILE
506

INSPECTION COMPONENT
212

IDENTIFY A SECOND SMALL FILE THAT HAS BEEN ADDED TO THE SECOND STORAGE CONTAINER SUBSEQUENT TO A SECOND PREVIOUS TIME AT WHICH SMALL FILES IN THE SECOND STORAGE CONTAINER WERE COMPACTED INTO A SECOND COMPACTED FILE
508

INSTRUCT THE COMPACTION COMPONENT TO COMPACT FILES IN THE FIRST AND SECOND STORAGE CONTAINERS
510

MANAGED FILE COMPACTION FOR DISTRIBUTED STORAGE SYSTEMS

BACKGROUND

As organizations continue to move their operations and offerings to web-based solutions, and the usage of use of network-based resources and services by these organizations and end users continues to increase, an enormous volume of data is being generated around this network activity. This large volume of data, often referred to as "big data," is incredibly useful for organizations, such as by allowing them to improve operations, identify new opportunities for growth, and otherwise improve the efficiency of the organizations. While some of this data is structured data and stored in a predefined format, much of the data is unstructured data that includes a wide variety of data types stored in different formats. It can be difficult for organizations to store and analyze the different data types generated or gathered by their operations, particularly at scale.

Various centralized repositories have emerged, such as data lakes and data warehouses, that allow organizations to store data at any scale. Data lakes are particularly helpful in that they allow organizations to store structured data and unstructured data, and also give organizations the ability to understand and digest their data by enabling crawling, cataloging, and indexing. For instance, data lakes enable various types of analytics to be run on data, such as generating dashboards and visualizations, outputting real-time analytics, and enabling machine learning to guide better decisions. Data lakes are often implemented as distributed storage systems having storage containers located in different locations to serve as local repositories for various data sources. Distributed file systems that manage these storage systems are well-equipped to handle large data files (e.g., 64 megabytes (MB), 128 MB, etc.), but suffer from various inefficiencies when processing and analyzing small files (e.g., 1 kilobyte (KB), 5 KB, etc.). For instance, the small file problem is a common issue for various applications and can slow the processing and analysis of files, increase the retrieval time of files, result in wasted storage, and potentially cause other issues.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 5A and 5B collectively illustrate a flow diagram of an example method for a file-compaction system that includes a scheduler component to trigger inspections of storage containers, an inspection component to inspect the containers and identify small files, and a compaction component that compacts and appends the small files into large files.

DETAILED DESCRIPTION

Figure 1:
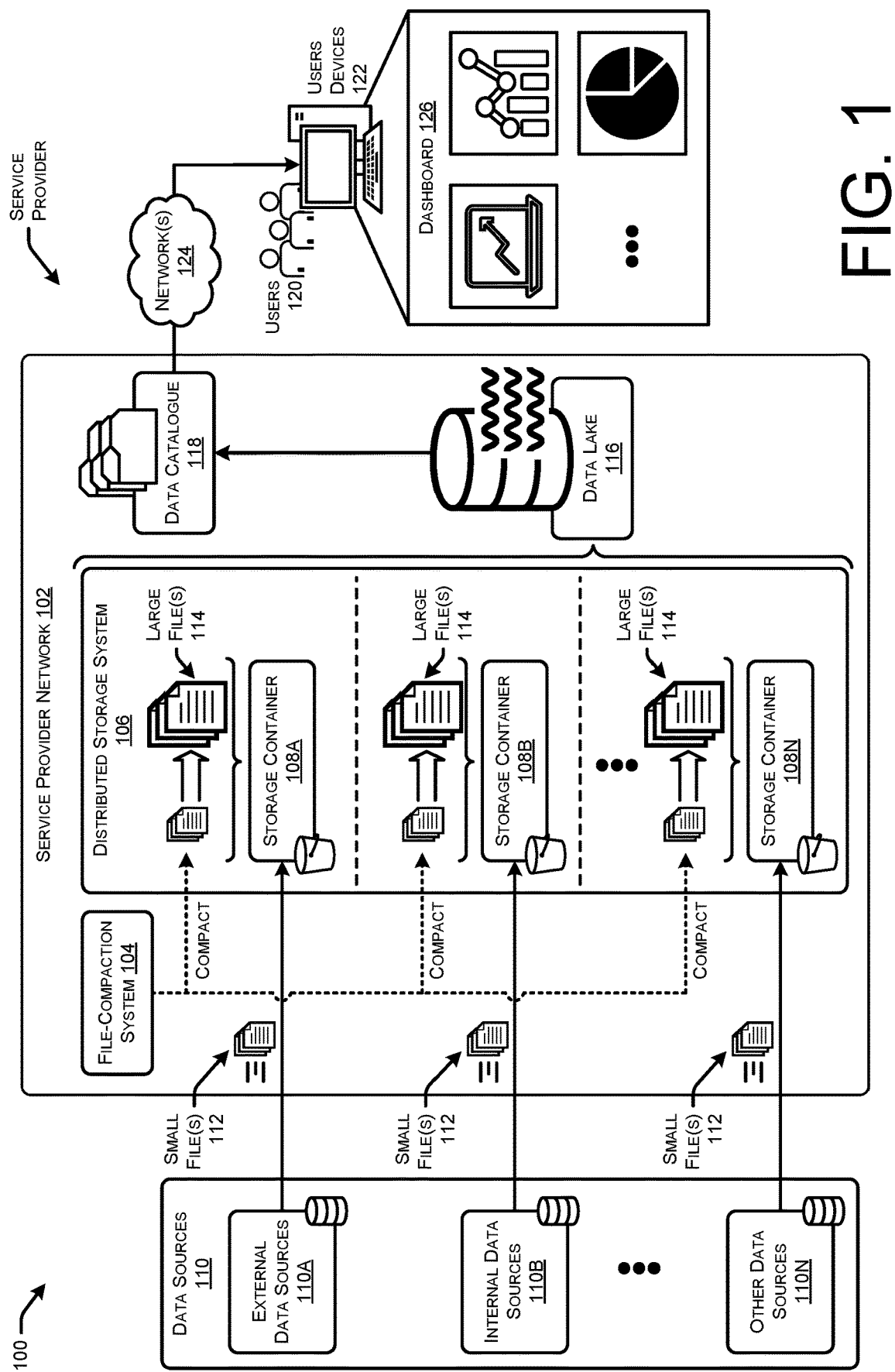
FIG. 1 illustrates a system-architecture diagram of an example environment in which a file-compaction system monitors storage containers in a distributed storage system, identifies small files that have been added to the storage containers, and automatically compacts the small files into larger files.

This disclosure describes techniques implemented by file-compaction system that monitors storage containers in distributed storage systems, identifies small files that have been added to the storage containers, and automatically compacts the small files into larger files. Distributed file systems are well-equipped to manage large data files, but handling small files can slow the processing and analyzing of files, increase the retrieval time of files, and result in wasted storage. Compacting the small files into large files can help resolve the small file problem. However, compacting a high number of small files can take a significant amount of time, and the storage container is "locked" during the compaction process which prevents the data from being queried and accessed. The file-compaction system monitors the storage containers to determine whether new small files have been added from data sources. Upon detecting added small files, the file compactor automatically compacts those small files into large files. The file-compaction system continues to append new small files onto large files until the large files hit an optimal size for the file system (e.g., 128 megabytes (MB), 256 MB)), and then begin compacting small files into a new large file. By continuously identifying and compacting small files that have been added to storage containers, the file compactor provides the distributed file system with large files while minimizing the amount of time the storage containers are locked during compaction.

As noted above, organizations use data lakes as centralized repositories designed to store, process, and secure large amounts of structured, semi-structured, and/or unstructured data. Data lakes are useful in that the data files can be stored in the native formats of the various types of data files. The data sources for these data lakes are often dispersed across different locations and/or different domains, and due to this, the distributed storage systems of the data lakes are used to temporarily store the raw data generated by the data sources as the data undergoes further processing and analysis. These distributed storage systems are composed of many storage containers (e.g., file storage, blob storage, etc.) distributed at different locations to receive the data files generated by the different data sources. Distributed file systems (DFS) are used to manage these distributed storage systems and allow programs to access or store the files on the storage containers of the distributed storage systems. These distributed file systems help manage accessibility to the storage containers and data files therein (e.g., using namespaces), and provide additional management features such as redundancy through file replication.

Distributed file systems are well-equipped to handle large files, and many distributed file systems are designed to manage large files of a target size or block size, such as 128 MB or 256 MB. However, the data files that are placed into these storage containers come in different sizes, types, formats, etc., and often include small files. Generally, a small file has a file size on the order of kilobytes (e.g., 5 kilobytes (KB), 50 KB, etc.), but is as described herein, a small file may be any size smaller than a target size or block size of the distributed file systems. However, as explained above, the distributed file systems suffer from various inefficiencies when processing and analyzing small files.

The file-compaction system may include various components, or subsystems, that work in conjunction to identify small files in storage containers, and automatically compact the small files into larger files. For instance, the file-compaction system may include a scheduler component that triggers inspections of the storage containers to determine whether the storage containers include small files that need to be compacted. The scheduler component may trigger the inspections based on various events, rules, or factors. For instance, the scheduler component may simply trigger inspection according to a predefined schedule (e.g., every minute, every hour, etc.). In some examples, the scheduler component may trigger inspection based on access patterns of users that query or access the data. For instance, the file-compaction system may monitor accesses or queries made by users, and determine access patterns. The scheduler component may trigger inspections based on those access patterns such that the small files in the containers have been compacted into large files prior to times at which users are likely to access the data files.

The file-compaction system may include an inspection component that, when instructed by the scheduler component, inspects contents of the storage containers. The inspection component may utilize an inspection configuration file that provides information usable by the inspection component to inspect individual storage containers. For instance, the inspection configuration file may indicate the storage container that is to be inspected, a file format of the storage container, and/or other data usable by the inspection component to inspect the container. Further, the inspection component may maintain a table or other data structure that includes file identifiers for the small files that previously were compacted by the file-compaction system into the compacted file. Using this information, the inspection component may determine, for individual storage containers, whether or not small files have been added to the containers subsequent to the previous file compaction process. In instances where the inspection component identifies small files that need compacting, the inspection component may generate a metadata file that indicates the small files that need compacting, and trigger or instruct a compaction component to perform a compaction.

The compaction component may use the metadata file along with a compaction configuration file to identify the small file(s) that need compacting, and compact the small files. The compaction configuration file may indicate a source format of the file, a target format of the file, an optimal file size for large files in the storage container, and/or other information usable to compact the small files. Depending on the file format and/or distributed file system, the compaction component may perform different compaction techniques. For instance, the compaction component may execute a merge command to logically append small files to larger ones, combining small files from a single partition by copying the data partition into a new table and dropping the original partition and inserting the new compacted one, and/or performing other compaction techniques. The compaction component may continue to compact, append, or otherwise combine small files into large files until the compaction component determines that the large files have hit an optimal file size for the distributed file system and/or file type (e.g., 128 MB, 256 MB, etc.). After hitting the optimal file size, the compaction component may begin compacting small files into a different large file. In this way, storage containers may include multiple large files that are at optimal sizes for the particular distributed file system.

Further, the compaction component may build metadata for the large files that is used for optimal read performance for downstream applications that consume the large files. Generally, the compaction component may embed the metadata into the large files to describe the complex content stored therein. The metadata for files is processed before the data in the files can be decompressed and read. The compaction component may build new metadata for the large files based on the contents of the large files such that processes that consume the large files can efficiently process the large files.

Using these techniques, distributed file systems are able to manage primarily large data files which increases the performance of these distributed file systems, and improves the performance experienced by downstream processes. For instance, the distributed file systems may be used to move the files from the storage containers of the distributed storage systems into data lakes that can enable various types of analytics to be run on the data, such as generating dashboards and visualizations, outputting real-time analytics, and enabling machine learning to guide better decisions. The data lakes may be accessed or queried by users that utilize data catalogues that are continuously updated with references to data in the data lake. The data catalogues serve as an index or inventory of the data accessible from the data lake, as well as the location, schema, and other information for the various data.

Generally, the components or subsystems described herein as being included in the file-compaction system may also be distributed architectures including instances of each component. For instance, the inspection component and compaction component may be implemented as a plurality of individual instances that are spun up on computing resources near the storage containers to inspect the storage containers. In some instances, the file-compaction system may be included in or otherwise associated with the distributed file system that is managing the distributed storage system.

The techniques described herein may improve the performance of distributed file systems, as well as systems that rely on or interact with the distributed file systems, in various ways. For instance, the techniques may improve the speed at which the distributed file systems access and process data, reduce the amount of storage used to store data files, and decrease the retrieval time taken by the distributed file systems to locate and retrieve data files. Further, by compacting small files on a more consistent basis, users are able to access or query the data more frequently because the storage containers are locked for short periods of time.

Some of the techniques described herein are done so with respect to a service provider network, such as a cloud provider network or platform. However, the techniques may be utilized in any type of network or network architecture, such as on-premises architectures, cloud architectures, service provider architectures, and any combination thereof.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a file-compaction system 104 monitors storage containers 108 in a distributed storage system 106, identifies small files 112 that have been added to the storage containers 108, and automatically compacts the small files 112 into larger files 114.

In some examples, a service provider may manage a service provider network 102 that may include the file-compaction system 104 that performs the techniques described herein. Service providers offer cloud-based services to fulfill users' computing-service needs without the users having to invest in and maintain computing infrastructure required to implement their services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks. Users may be provided with logically isolated portions of the service provider network, often referred to as virtual networks or virtual private clouds (VPCs), in which they can launch resources to support their applications.

The service provider network 102 may include a file-compaction system 104 that includes components for monitoring storage containers 108 in a distributed storage system 106, identifies small files 112 that have been added to the storage containers 108, and automatically compacts the small files 112 into larger files 114. Generally, the file-compaction system 104 may be, at least partly, a control-plane system that controls operations occurring in the service provider network 102. The file-compaction system 104 may be either centralized, or distributed, and be supported by one or more computing devices.

The distributed storage system 106 may include many storage containers 108 that receive data, such as small files 112 including data, from data sources 110. These data sources 110 are often dispersed across different locations and/or different domains, and due to this, distributed storage systems 106 are used to store the raw data generated by the data sources 110 in storage containers 108 of a data lake 116 for further processing and analysis. These distributed storage systems 106 are composed of many storage containers 108 (e.g., file storage, blob storage, etc.) distributed at different locations to receive the data files 112 generated by the different data sources 110. The data sources 110 may be any type of data source 110, such as external data sources 110A outside the service provider network 102 such as enterprise data sources, device logs (e.g., personal devices, IoT devices, etc.), software-as-a-service SaaS data, sensor data sources, and so forth. The data sources may include internal data sources 110B based on information internal to the service provider network 102, such as resource utilization data for applications (e.g., memory usage, CPU usage, storage usage, etc.), audit logs, etc.

The distributed storage system 106 may be managed using a distributed file systems (DFS) which allow programs to access or store the files on the storage containers 108 of the distributed storage system 106. These distributed file systems help manage accessibility to the storage containers 108 and data files therein (e.g., using namespaces), and provide additional management features, such as redundancy through file replication. The data sources 110 may utilize or communicate with the distributed file system to store data in the storage containers 108, such as small files 112 (and/or other types of data or sizes of files).

The file-compaction system 104 may include various components, or subsystems, that work in conjunction to identify small files 112 in storage containers 108, and automatically compact the small files 112 into larger files 114. For instance, the file-compaction system 104 may include a scheduler component that triggers inspections of the storage containers 108 to determine whether the storage containers 108 include small files 112 that need to be compacted. The scheduler component may trigger the inspections based on various events, rules, or factors. For instance, the scheduler component may simply trigger inspection according to a predefined schedule (e.g., every minute, every hour, etc.). In some examples, the scheduler component may trigger inspection based on access patterns of users 120 that query or access the data. For instance, the file-compaction system 104 may monitor accesses or queries made by users 120, and determine access patterns. The scheduler component may trigger inspections based on those access patterns such that the small files 112 in the containers 108 have been compacted into large 114 files prior to times at which users 120 are likely to access the data files.

The file-compaction system 104 may include an inspection component that, when instructed by the scheduler component, inspects contents of the storage containers 108. The inspection component may utilize an inspection configuration file that provides information usable by the inspection component to inspect individual storage containers 108. For instance, the inspection configuration file may indicate the storage container 108 that is to be inspected, a file format of the storage container 108, and/or other data usable by the inspection component to inspect the container 108. Further, the inspection component may maintain a table or other data structure that includes file identifiers for the small files 112 that previously were compacted by the file-compaction system 104 into the compacted file. Using this information, the inspection component may determine, for individual storage containers 108, whether or not small files 112 have been added to the containers 108 subsequent to the previous file compaction process. In instances where the inspection component identifies small files 112 that need compacting, the inspection component may generate a metadata file that indicates the small files 112 that need compacting, and trigger or instruct a compaction component to perform a compaction.

The compaction component may use the metadata file along with a compaction configuration file to identify the small file(s) 112 that need compacting, and compact the small files 112. The compaction configuration file may indicate a source format of the file, a target format of the file, an optimal file size for large files in the storage container 108, and/or other information usable to compact the small files 112. Depending on the file format and/or distributed file system, the compaction component may perform different compaction techniques. For instance, the compaction component may execute a merge command to logically append small files 112 to larger ones, combine small files 112 from a single partition by copying the data partition into a new table and dropping the original partition and inserting the new compacted one, and/or performing other compaction techniques. The compaction component may continue to compact, append, or otherwise combine small files 112 into large files 114 until the compaction component determines that the large files 114 have hit an optimal file size for the distributed file system and/or file type (e.g., 128 MB, 256 MB, etc.). After hitting the optimal file size, the compaction component may begin compacting small files 112 into a different large file 114. In this way, storage containers 108 may include multiple large files 114 that are at optimal sizes for the particular distributed file system.

The optimal file size may be determined based on various information. For example, the optimal file size may be determined based on the distributed file system 226 that is handling the files. The optimal file size may also be determined based on the nodes, devices, and/or applications that are reading the files. For instance, devices with larger amounts of memory may have optimal file sizes that are larger than devices with smaller amounts of memory. As another example, the optimal file size may be determined based on the type of data and/or analytics performed on the files.

Further, the compaction component may build metadata for the large files 114 that is used for optimal read performance for downstream applications that consume the large files 114. Generally, the compaction component may embed the metadata into the large files to describe the complex content stored therein. The metadata for files is processed before the data in the files 114 can be decompressed and read. The compaction component may build new metadata for the large files 114 based on the contents of the large files 114 such that processes that consume the large files 114 can efficiently process the large files 114.

Using these techniques, distributed file systems are able to manage primarily large data files 114 which increases the performance of these distributed file systems, and improves the performance experienced by downstream processes. For instance, the distributed file systems may be used to manage the files in the storage containers 108 of the distributed storage system 106 that is part of the data lake 116 that can enable various types of analytics to be run on the data, such as generating dashboards and visualizations, outputting real-time analytics, and enabling machine learning to guide better decisions. The data lake 116 may be accessed or queried by users 120 that utilize data catalogues 118 that are continuously updated with references to data in the data lake 116. The data catalogue 118 serves as an index or inventory of the data accessible from the data lake 116, as well as the location, schema, and other information for the various data. The users 120 may utilize their user devices 122 to query the data lake 116 using data catalogues 118 (which may be internal or external data catalogues 118) and be presented with information via a dashboard 126. The information may include analytics, metrics, raw data information, machine learning information, and/or any type of information.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 102 can be formed as a number of regions 110, where a region 110 is a separate geographical area in which the cloud provider clusters data centers. Each region 110 can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region 110 are positioned far enough away from one other that the same natural disaster should not take more than one availability zone offline at the same time. Users 120 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region 110 can operate two or more TCs for redundancy. Regions 110 are connected to a global network which includes private networking infrastructure (e.g., fiber connections controlled by the cloud provider) connecting each region 110 to at least one other region 110. The cloud provider network may deliver content from points of presence outside of, but networked with, these regions 110 by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 102 may provide on-demand, scalable computing services to users 120 through a network, for example allowing users 120 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 120 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 120, the hardware associated with the virtual computing devices can be scaled up or down depending upon the resources the user 120 requires. Users 120 can choose to deploy their virtual computing systems to provide network-based services for their own use and/or for use by their users or client.

The cloud provider network 102 may implement various computing resources or services, which may include a virtual compute service, data processing service(s) (e.g., map reduce, data flow; and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 120 of the cloud provider network 102, which may be provisioned in user accounts.

The users 120 may create user accounts with the service provider to utilize the resources and services of the service provider network 102. The users 120 may utilize their devices to communicate over one or more networks 118 (e.g., WANs, PANs, LANs, etc.) with the service provider network 102. The user devices may comprise any type of computing device configured to communicate over network(s) 128, such as mobile phones, tablets, laptop computers, desktop computers, televisions, servers, and/or any other type of computing device. The users 120 (e.g., network administrators, organization employees, etc.) may interact with the service provider network 102, via their user account and/or one or more user portals (e.g., web console, command line interface (CLI), application programming interface (API), etc.).

Generally, the network-visibility system 104, and components thereof, may comprise software, firmware, and/or other logic that is supported one computing device, or across more computing devices in the service provider network 102. Additionally, the network-visibility system 104 may comprise a system of other devices. The techniques described herein are generally described with respect to a service provider network, such as a cloud provider network or platform. However, the techniques are generally applicable for any network, such as on-premises networks, hybrid networks, and so forth.

Figure 2:
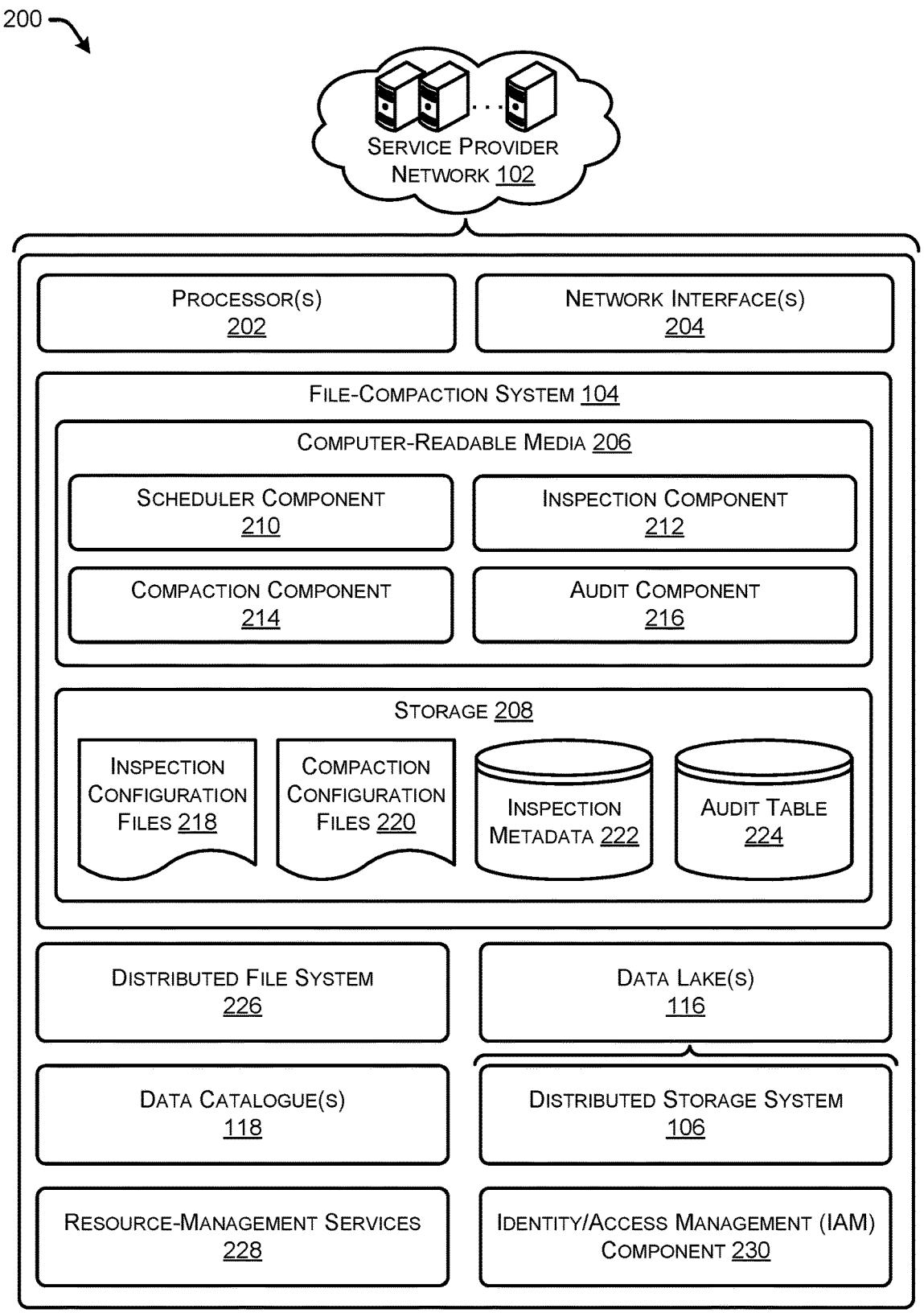
FIG. 2 illustrates a component diagram of example components of a service provider network that includes a file-compaction system.

FIG. 2 illustrates a component diagram of example components of a service provider network 102 that includes a file-compaction system 104.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s), and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include storage 208 which may comprise one, or multiple, repositories or other storage locations for persistently storing and managing collections of data such as databases, simple files, binary, and/or any other data. The data store 208 may include one or more storage locations that may be managed by one or more database management systems. The computer-readable media 206 may store portions, or components, of the file compaction system 104 described herein.

For instance, the file-compaction system 104 may include a scheduler component 210 that triggers inspections of the storage containers 108 to determine whether the storage containers 108 include small files 112 that need to be compacted. The scheduler component 210 may trigger the inspections based on various events, rules, or factors. For instance, the scheduler component 210 may simply trigger inspection according to a predefined schedule (e.g., every minute, every hour, etc.). In some examples, the scheduler component 210 may trigger inspection based on access patterns of users 120 that query or access the data. For instance, the scheduler component 210 may monitor accesses or queries made by users 120, and determine access patterns. The scheduler component 210 may trigger inspections based on those access patterns such that the small files 112 in the containers 108 have been compacted into large 114 files prior to times at which users 120 are likely to access the data files.

The file-compaction system 104 may further include an inspection component 212 that, when instructed by the scheduler component 210, inspects contents of the storage containers 108. The inspection component 212 may utilize an inspection configuration file 218 that provides information usable by the inspection component 212 to inspect individual storage containers 108. For instance, the inspection configuration file 218 may indicate the storage container 108 that is to be inspected, a file format of the storage container 108, and/or other data usable by the inspection component 212 to inspect the container 108. Further, the inspection component 212 may maintain a table or other data structure that includes file identifiers for the small files 112 that previously were compacted by the file-compaction system 104 into the compacted file. Using this information, the inspection component 212 may determine, for individual storage containers 108, whether or not small files 112 have been added to the containers 108 subsequent to the previous file compaction process. In instances where the inspection component 212 identifies small files 112 that need compacting, the inspection component 212 may generate a metadata file 222 that indicates the small files 112 that need compacting, and trigger or instruct a compaction component 214 to perform a compaction.

The compaction component 214 may use the metadata file 222 along with a compaction configuration file 220 to identify the small file(s) 112 that need compacting, and compact the small files 112. The compaction configuration file 220 may indicate a source format of the file, a target format of the file, an optimal file size for large files in the storage container 108, and/or other information usable to compact the small files 112. Depending on the file format and/or distributed file system, the compaction component 214 may perform different compaction techniques. For instance, the compaction component 214 may execute a merge command to logically append small files 112 to larger ones, combine small files 112 from a single partition by copying the data partition into a new table and dropping the original partition and inserting the new compacted one, and/or performing other compaction techniques. The compaction component 214 may continue to compact, append, or otherwise combine small files 112 into large files 114 until the compaction component determines that the large files 114 have hit an optimal file size for the distributed file system and/or file type (e.g., 128 MB, 256 MB, etc.). After hitting the optimal file size, the compaction component 214 may begin compacting small files 112 into a different large file 114. In this way, storage containers 108 may include multiple large files 114 that are at optimal sizes for the particular distributed file system.

Further, the compaction component 214 may build metadata for the large files 114 that is used for optimal read performance for downstream applications that consume the large files 114. Generally, the compaction component 214 may embed the metadata into the large files to describe the complex content stored therein. The metadata for files is processed before the data in the files 114 can be decompressed and read. The compaction component 214 may build new metadata for the large files 114 based on the contents of the large files 114 such that processes that consume the large files 114 can efficiently process the large files 114.

In some instances, the file-compaction system 104 may further include an audit component 216 that is used to perform various auditing techniques. For instance, the audit component 216 may maintain an audit table 224 that keeps a history of the operations performed by the file-compaction system 104. Any time a user 120 has an issue, the user 120 can go in and troubleshoot the issue using the data listed in the audit table 224.

The service provider network 102 may further include or utilize a distributed file system 226 that is hosted on different devices at different locations. The distributed file system 226 may allow the distributed storage system 106 to share data and resources using a common file system, allow programs to access or store the files on the storage containers 108 of the distributed storage systems 106, manage accessibility to the storage containers 108 and data files therein (e.g., using namespaces), and provide additional management features such as redundancy through file replication.

The service provider network 102 may further include one or more data lakes 116 (and/or data warehouses). The data lake(s) 116 may store structured data and unstructured data, and also digest data by enabling crawling, cataloging, and indexing. For instance, data the lakes 116 enable various types of analytics to be run on data, such as generating dashboards and visualizations, outputting real-time analytics, and enabling machine learning to guide better decisions. The data lakes 116 may include or be associated with the distributed storage systems 106 having storage containers 108 located in different locations to serve as local repositories for various data sources. The data lake 116 generally includes the distributed storage system 106 and storage containers 108 described herein. The data lake 116 includes various stages or areas through which the data is transitioned. For instance, the data lake 116 may include a landing stage which includes storage containers 108 to store raw data as it comes in from the data sources 110. Further, the data lake 116 may include a staging area that includes storage containers 108 where the data is prepared for further processing. The data lake 116 may include a processed area or stage that includes storage containers 108 where the data is processed and prepared for eventual analytics. Generally, the small files 112 may be compacted during or in any of these stages and storage containers 108.

The service provider network 102 may further include or provide one or more data catalogues 118 that enable users 120 to query the data lake(s) 116 for various data contained therein where the data catalogue(s) 118 are continuously updated with references to data in the data lake 116. The data catalogue(s) 118 serve as an index or inventory of the data accessible from the data lake 116, as well as the location, schema, and other information for the various data. The data catalogue(s) 118 may include or comprise a collection of metadata, combined with data management and search tools, that helps data users 120 to find the data that they need, serves as an inventory of available data, and provides information to evaluate fitness of data for intended uses.

The service provider network 102 may further include various resource-management services 228 that provide automated management of computing resources that host workloads, applications, and services of users 102. For instance, the resource-management services 228 may provide scalable compute, scalable storage, scalable memory, sufficient networking resources, and/or any other type of computing resource needed by the users 120. The resource-management services 228 may serve as data sources 110 in some instances and publish metrics, utilization data, or other useful data to storage containers 108 of the distributed storage system 106.

To utilize the services provided by the service provider network 102, the users 120 may register for an account with the service provider network 102. For instance, users 120 may utilize a user device to interact with an identity and access management (IAM) component 230 that allows the users 120 to create user accounts 230 with the service provider network 102. Generally, the IAM component 230 may enable the users 120 to manage their network infrastructures remotely, and view analytics provided by the network-visibility system 104. Generally, the different user accounts can assume different roles, or sets or permissions/credentials, that allow network users 120 to perform different actions, and be restricted from performing some actions.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
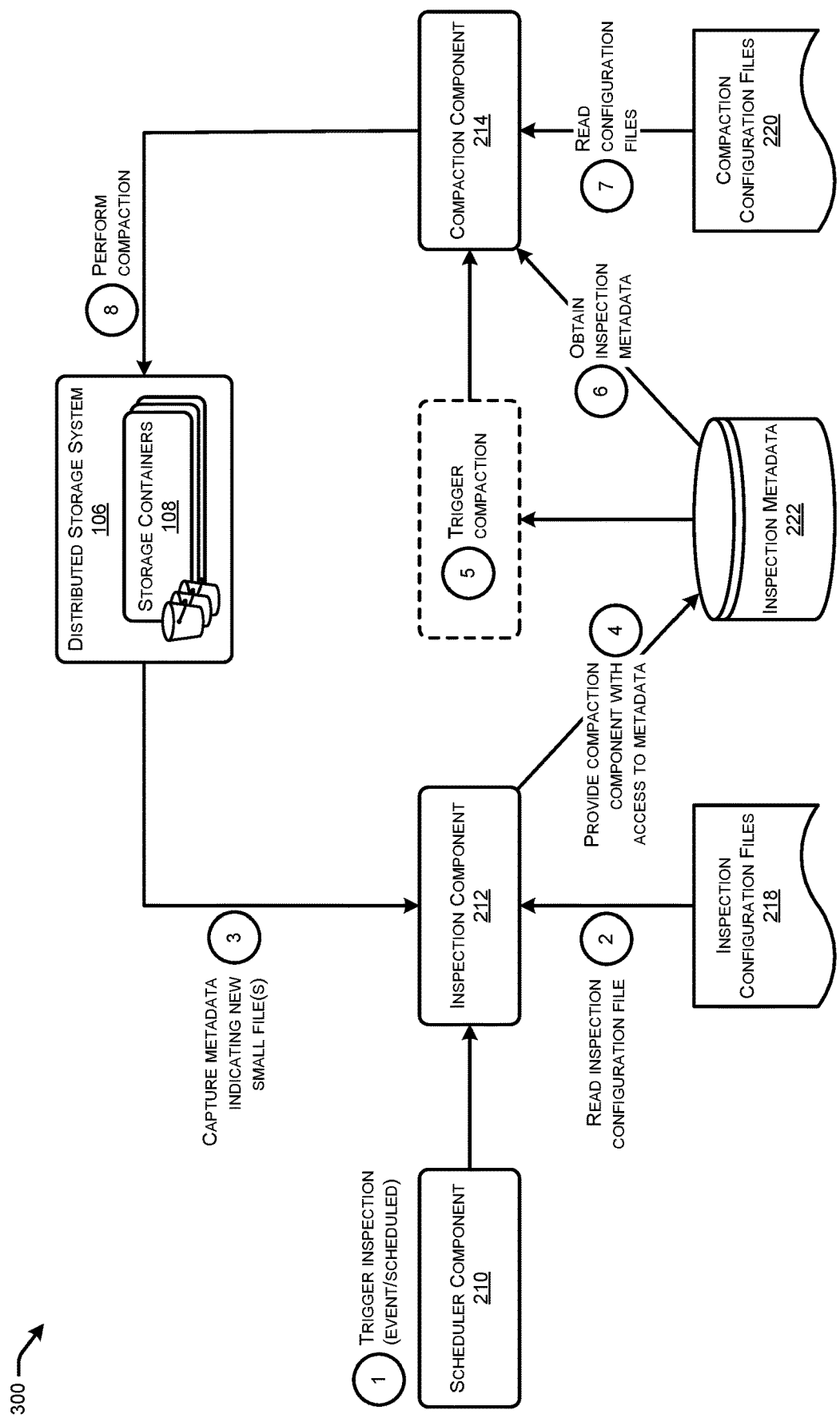
FIG. 3 illustrates a flow diagram of an example process for a file-compaction system to identify small files that have been added to storage containers, and automatically compact the small files into larger files.

FIG. 3 illustrates a flow diagram of an example process 300 for a file-compaction system 104 to identify small files 112 that have been added to storage containers 108, and automatically compact the small files 112 into larger files 114.

The file-compaction system 104 may include various components, or subsystems, that work in conjunction to identify small files in storage containers 108, and automatically compact the small files 112 into larger files 114. For instance, the file-compaction system 104 may include a scheduler component 210 that, at "1," that triggers inspections of the storage containers 108 to determine whether the storage containers 108 include small files 112 that need to be compacted. The scheduler component 210 may trigger the inspections based on various events, rules, or factors. For instance, the scheduler component 210 may simply trigger inspection according to a predefined schedule (e.g., every minute, every hour, etc.). In some examples, the scheduler component 210 may trigger inspection based on access patterns of users 120 that query or access the data. For instance, the file-compaction system 104 may monitor accesses or queries made by users 120, and determine access patterns. The scheduler component 210 may trigger inspections based on those access patterns such that the small files 112 in the containers 108 have been compacted into large 114 files prior to times at which users 120 are likely to access the data files.

The file-compaction system 104 may include an inspection component 212 that, at "2" when instructed by the scheduler component 210, determine to inspect contents of the storage containers 108. The inspection component 212 may utilize an inspection configuration file 218 that provides information usable by the inspection component 212 to inspect individual storage containers 108. For instance, the inspection configuration file 218 may indicate the storage container 108 that is to be inspected, a file format of the storage container 108, and/or other data usable by the inspection component 212 to inspect the container 108.

At "3," the inspection component 212 may analyze or observe contents of the storage containers(s) 108 and capture metadata indicating new small files 112 that have been added. The inspection component 212 may maintain a table or other data structure that includes file identifiers for the small files 112 that previously were compacted by the compaction component 214 into the compacted file. Using this information, the inspection component 212 may determine, for individual storage containers 108, whether or not small files 112 have been added to the containers 108 subsequent to the previous file compaction process. In instances where the inspection component identifies small files 112 that need compacting, the inspection component 212 may generate a metadata file that is stored, at "4", in the inspection metadata 222 that indicates the small files 112 that need compacting, and trigger or instruct the compaction component 214 to perform a compaction.

The compaction component 214 may, at "5", receive a trigger to perform a compaction, and obtain the inspection metadata 222 at "6" and read the compaction configuration file(s) 220 at "7." The compaction component 214 may use the inspection metadata 222 along with the compaction configuration file 220 to identify the small file(s) 112 that need compacting, and compact the small files 112. The compaction configuration file 220 may indicate a source format of the file, a target format of the file, an optimal file size for large files in the storage container 108, and/or other information usable to compact the small files 112. Depending on the file format and/or distributed file system, the compaction component 214 may perform different compaction techniques at "8". For instance, the compaction component 214 may execute a merge command to logically append small files 112 to larger ones, combine small files 112 from a single partition by copying the data partition into a new table and dropping the original partition and inserting the new compacted one, and/or performing other compaction techniques. The compaction component 214 may continue to compact, append, or otherwise combine small files 112 into large files 114 until the compaction component 214 determines that the large files 114 have hit an optimal file size for the distributed file system and/or file type (e.g., 128 MB, 256 MB, etc.). After hitting the optimal file size, the compaction component 214 may begin compacting small files 112 into a different large file 114. In this way, storage containers 108 may include multiple large files 114 that are at optimal sizes for the particular distributed file system.

Further, the compaction component 214 may build metadata for the large files 114 that is used for optimal read performance for downstream applications that consume the large files 114. Generally, the compaction component 214 may embed the metadata into the large files to describe the complex content stored therein. The metadata for files is processed before the data in the files 114 can be decompressed and read. The compaction component 214 may build new metadata for the large files 114 based on the contents of the large files 114 such that processes that consume the large files 114 can efficiently process the large files 114.

Using these techniques, distributed file systems are able to manage primarily large data files 114 which increases the performance of these distributed file systems, and improves the performance experienced by downstream processes. For instance, the distributed file systems may be used to move the files from the storage containers 108 of the distributed storage system 106 into other storage containers 108 of a data lake 116 that can enable various types of analytics to be run on the data, such as generating dashboards and visualizations, outputting real-time analytics, and enabling machine learning to guide better decisions. The data lake 116 may be accessed or queried by users 120 that utilize data catalogues 118 that are continuously updated with references to data in the data lake 116. The data catalogue 118 serves as an index or inventory of the data accessible from the data lake 116, as well as the location, schema, and other information for the various data.

Figure 4A:
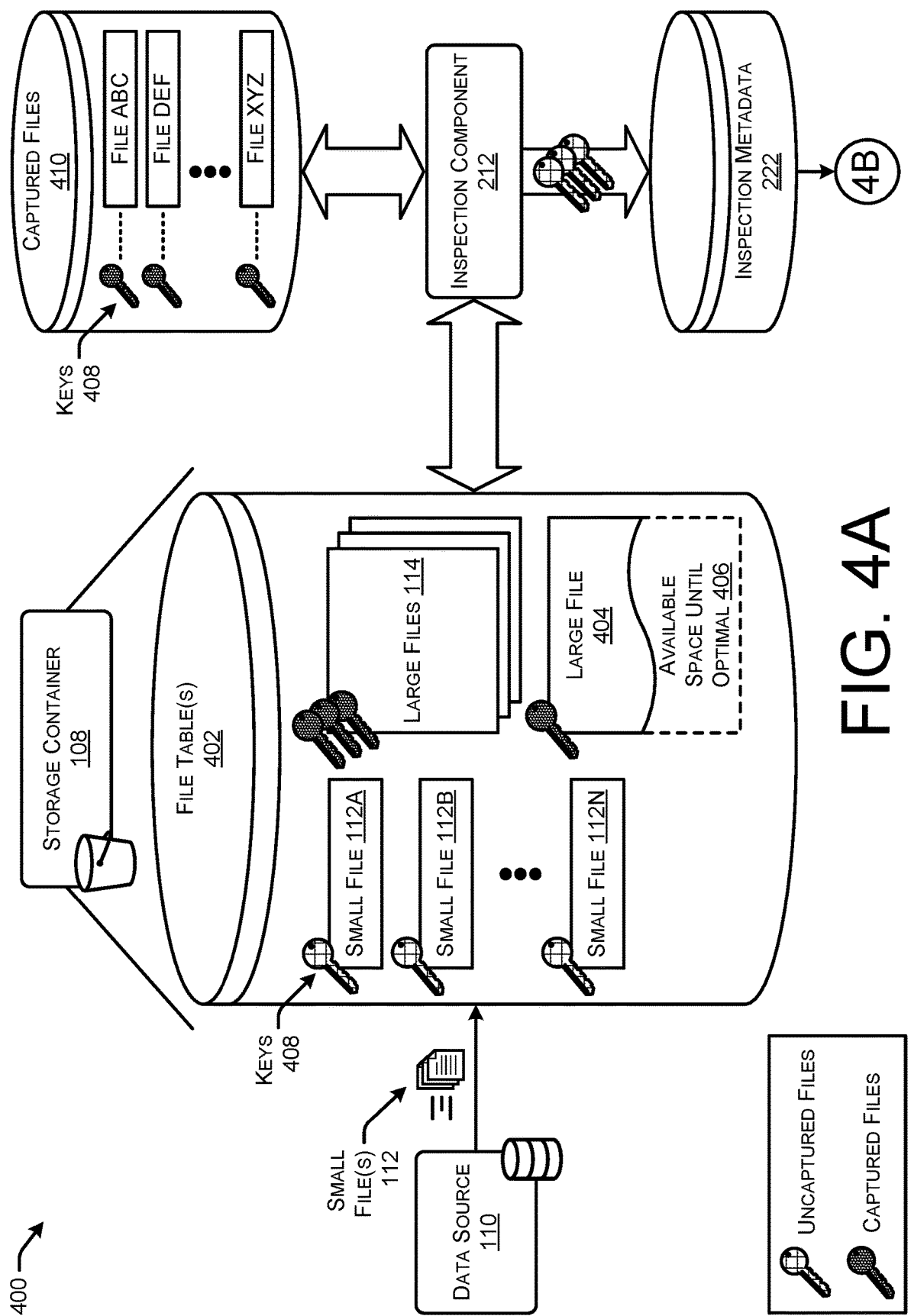
FIG. 4A illustrates a system-architecture diagram of an example environment in which an inspection component analyzes file tables of a storage container to identify small files that have been added to the storage container.

FIG. 4A illustrates a system-architecture diagram of an example environment 400 in which an inspection component 212 analyzes file tables of a storage container 108 to identify small files 112 that have been added to the storage container 108.

In some instances, the distributed storage system 106 may utilize unique identifiers to identify the files stored in file tables 402 of the storage containers 108. The unique identifiers may, in some examples, be keys 408 (or key names) that uniquely identify each file relative to other files stored in the distributed storage system 106. Upon being triggered or instructed by the scheduler component 210, the inspection component 212 may inspect the files of storage containers 108 and the files stored in the file tables 402 therein. The inspection component 212 may determine which keys 408 it has previously captured, or identified, and had compacted. For instance, the inspection component 212 may maintain an external table that stored indications of captured files 410 and the keys 408 representing what files have been captured by the inspection component 212 and compacted by the compaction component 214. The inspection component 212 may utilize that captured files 410 table to determine that one or more small files 112 have associated keys 408 that indicate the files are uncaptured files, and that the small files 112 need to be compacted. The inspection component 212 may then store indications of the keys 408 for the uncaptured small files 112 in the inspection metadata 222 file that is accessible by the compaction component 214. The inspection component 212 may additionally update the captured files 410 table to indicate the small files 112 that are now captured and are to be compacted.

Figure 4B:
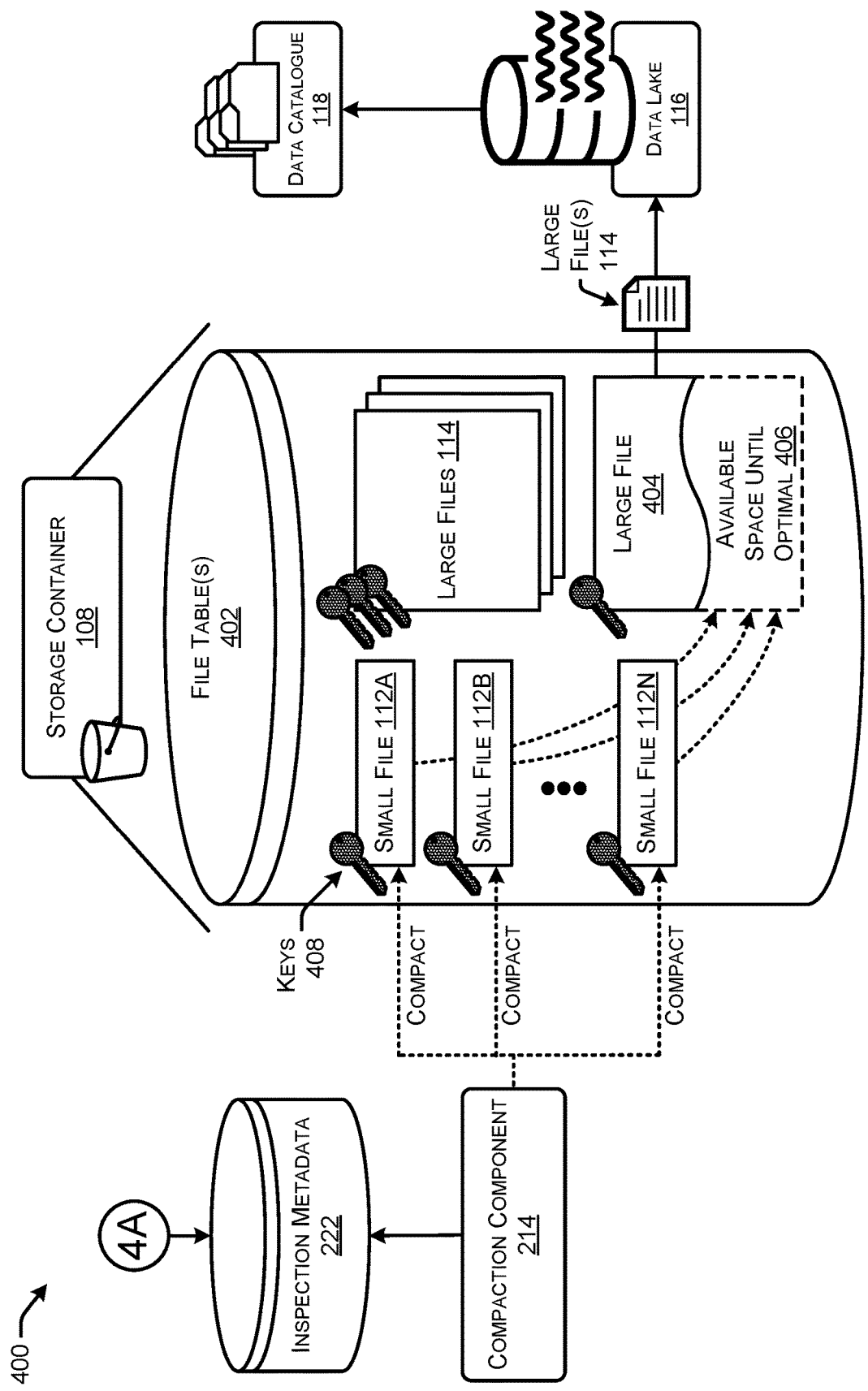
FIG. 4B illustrates a system-architecture diagram of an example environment in which a compaction component compacts small files in a storage container into a large file.

FIG. 4B illustrates a system-architecture diagram of an example environment 400 in which a compaction component 214 compacts small files 112 in a storage container 108 into a large file 114.

The compaction component 214 may access the inspection metadata 222 to determine which storage container 108 has added small files 112 that need to be compacted, and also identify the keys 408 (or any other identifier) that identify the small files 112. In some instances, the inspection metadata 222 may further include an indication of an optimal size of large files 404 for that storage container 108 and/or the distributed file system 226. The compaction component 214 may then compact, append, or otherwise combine the new small files in the storage container 108 into a large file 404 that has available space 406. If the compaction component 214 determines that the large file 404 has hit the optimal size, the compaction component 214 may then begin compacting small files 112 into a different large file 114 to ensure that the large files 114 are at the optimal size. The large files 114 are then provided (e.g., upon a query or request) from the data lake 116 and to the requesting entity.

FIGS. 5A, 5B, 6, and 7 illustrate flow diagrams of example methods 500, 600, and 700 that illustrate aspects of the functions performed at least partly by the service provider network 102 as described in this disclosure. The logical operations described herein with respect to FIGS. 5A, 5B, 6, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, 6, and 7, and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5B:
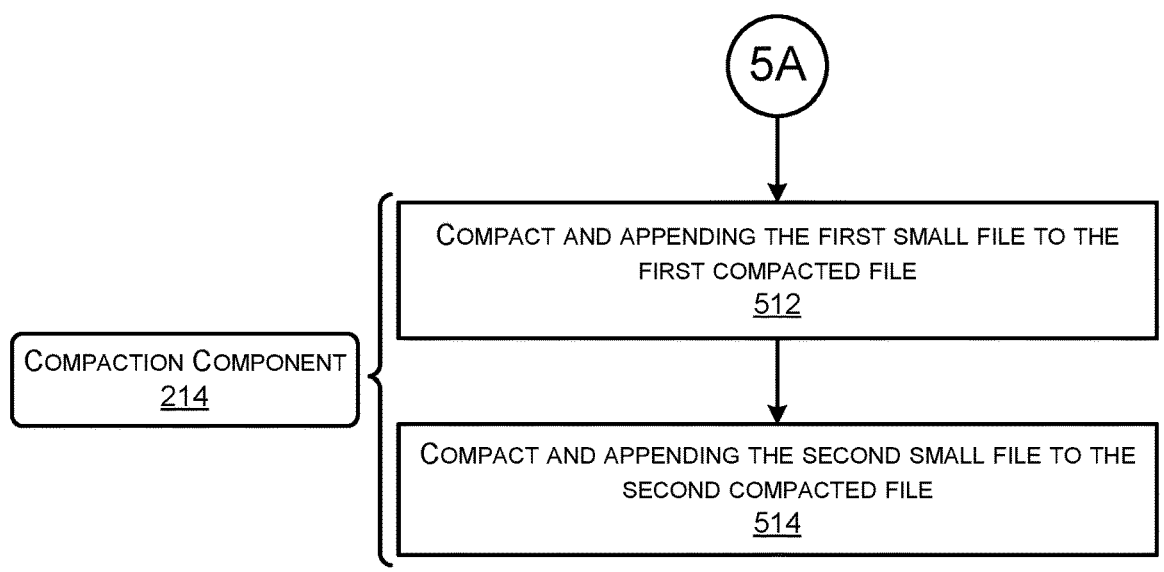

FIGS. 5A and 5B collectively illustrate a flow diagram of an example method 500 for a file-compaction system 104 that includes a scheduler component 210 to trigger inspections of storage containers 108, an inspection component 212 to inspect the containers 108 and identify small files 112, and a compaction component 214 that compacts and appends the small files 112 into large files 114. However, the steps of method 500 may be performed by a single component, or different components and variations thereof.

At 502, the scheduler component 210 may detect an event indicating that the inspection component 212 is to inspect contents of a first storage container 108 and a second storage container 108 of the distributed storage system 106. For instance, the scheduler component 210 may simply trigger inspection according to a predefined schedule (e.g., every minute, every hour, etc.), trigger inspection based on access patterns of users that query or access the data, and/or based on other events. At 504, the scheduler component 210 may instruct the inspection component 212 to inspect the contents of the first and second storage containers 108.

At 506, the inspection component 212 may identify a first small file 112 that has been added to the first storage container 108 subsequent to a first previous time at which small files 112 in the first storage container 108 were compacted into a first compacted file. Further, at 508, the inspection component 212 may identify a second small file 112 that has been added to the second storage container 108 subsequent to a second previous time at which small files 112 in the second storage container were compacted into a second compacted file. For instance, the inspection component 212 may analyze keys 408 of the small files with respect to captured files 410 to determine that one or more small files 112 are in the storage containers 108 that need to be compacted.

At 510, the inspection component 212 may instruct the compaction component 214 to compact files in the first and second storage containers 108. In some instances, the inspection component 212 may further provide inspection metadata 222 to the compaction component 214.

At 512, the compaction component 214 may compact and append the first small file 112 to the first compacted file, and at 514, compact and append the second small file 112 to the second compacted file. For instance, the compaction component 214 may execute a merge command to logically append small files to larger ones, combining small files from a single partition by copying the data partition into a new table and dropping the original partition and inserting the new compacted one, and/or performing other compaction techniques.

The compaction component 212 may continue to compact, append, or otherwise combine small files into large files until the compaction component determines that the large files have hit an optimal file size for the distributed file system and/or file type (e.g., 128 MB, 256 MB, etc.). After hitting the optimal file size, the compaction component may begin compacting small files into a different large file.

In some instances, subsequent to compacting and appending the first small file 112 to the first compacted file and the second small file 112 to the second compacted file, the compaction component 214 may delete the first small file 112 from the first storage container 108 and the second small file 112 from the second storage container 108.

In some examples, the file-compaction system 104 is included in a service provider network 102, and the distributed storage system 106 is included in a data lake 116 managed by the service provider network 102. In such examples, the service provider network 102 may expose a data catalogue 118 to a user account associated with data in the first and second compacted files, the data catalogue 118 including references to the data, receive, via the data catalogue 118 and from the user account, a query request for at least a portion of the data included in the first compacted file, and provide the user account with access to the first compacted file.

Figure 6:
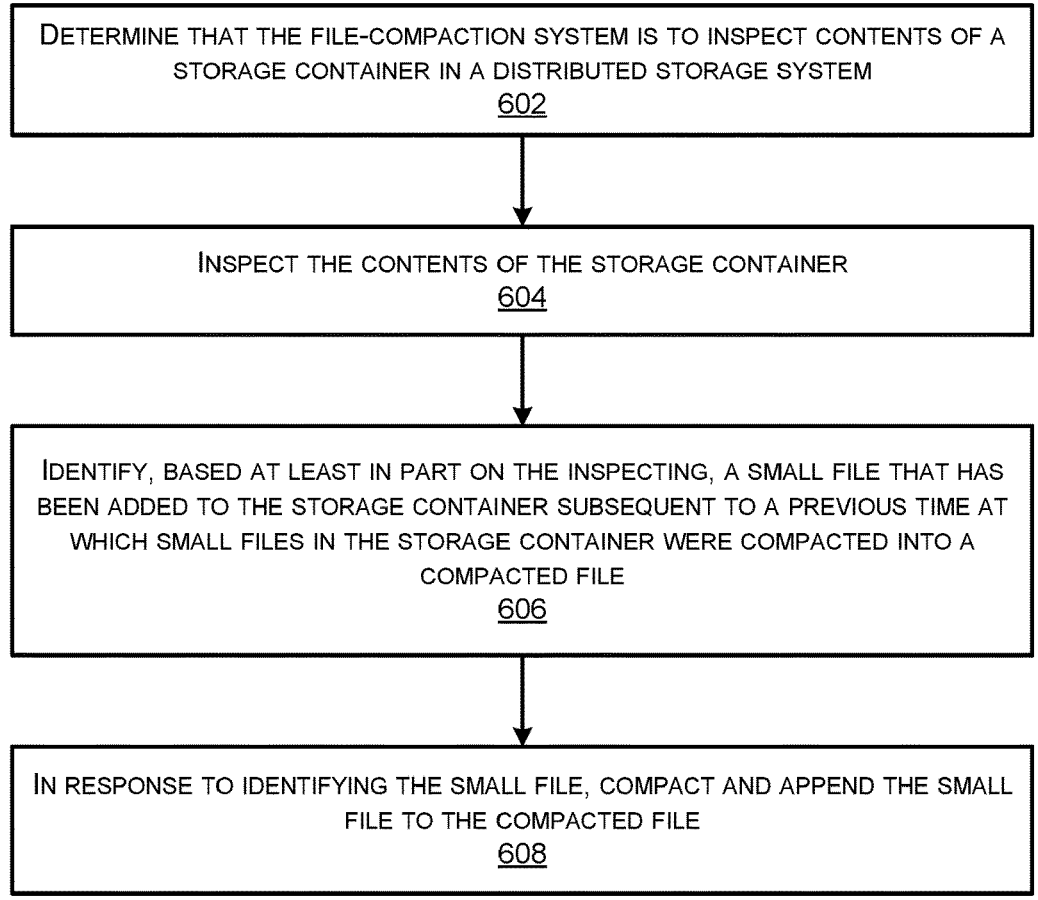
FIG. 6 illustrates a flow diagram of an example method for a file-compaction system to inspect a storage container, identify a small file that needs compacting, and compact and append the small file to an already compacted file.

FIG. 6 illustrates a flow diagram of an example method 600 for a file-compaction system to inspect a storage container, identify a small file that needs compacting, and compact and append the small file to an already compacted file.

At 602, the file-compaction system 104 may determine that the file-compaction system 104 is to inspect contents of a storage container 108 in a distributed storage system 106. For instance, a scheduler component 210 may trigger inspection according to a predefined schedule (e.g., every minute, every hour, etc.), trigger inspection based on access patterns of users that query or access the data, and/or based on other events.

At 604, the file-compaction system 104 may inspect the contents of the storage container 108, and at 606, the file-compaction system 104 may identify, based at least in part on the inspecting, a small file 112 that has been added to the storage container subsequent to a previous time at which small files 112 in the storage container 108 were compacted into a compacted file. For instance, the inspection component 212 may analyze keys 408 of the small files with respect to captured files 410 to determine that one or more small files 112 are in the storage containers 108 that need to be compacted.

At 608, the file-compaction system 104 may, in response to identifying the small file 112, compact and append the small file 112 to the compacted file. For instance, the compaction component 214 may execute a merge command to logically append small files 112 to larger ones, combining small files 112 from a single partition by copying the data partition into a new table and dropping the original partition and inserting the new compacted one, and/or performing other compaction techniques.

In some instances, the file-compaction system 104 may determine an optimal file size for files stored in the storage container 108, and determine that appending the small file 112 to the compacted file would result in the compacted file being of a size that is less than the optimal file size.

In some examples, the file-compaction system 104 may identify first metadata encoded into the small file 112 that describes data in the small file 112, wherein the first metadata is to be processed before the data in the small file is read, and modify second metadata encoded into the compacted file such that at least a portion of the second metadata describes the data in the small file 112 after being appended into the compacted file.

Figure 7:
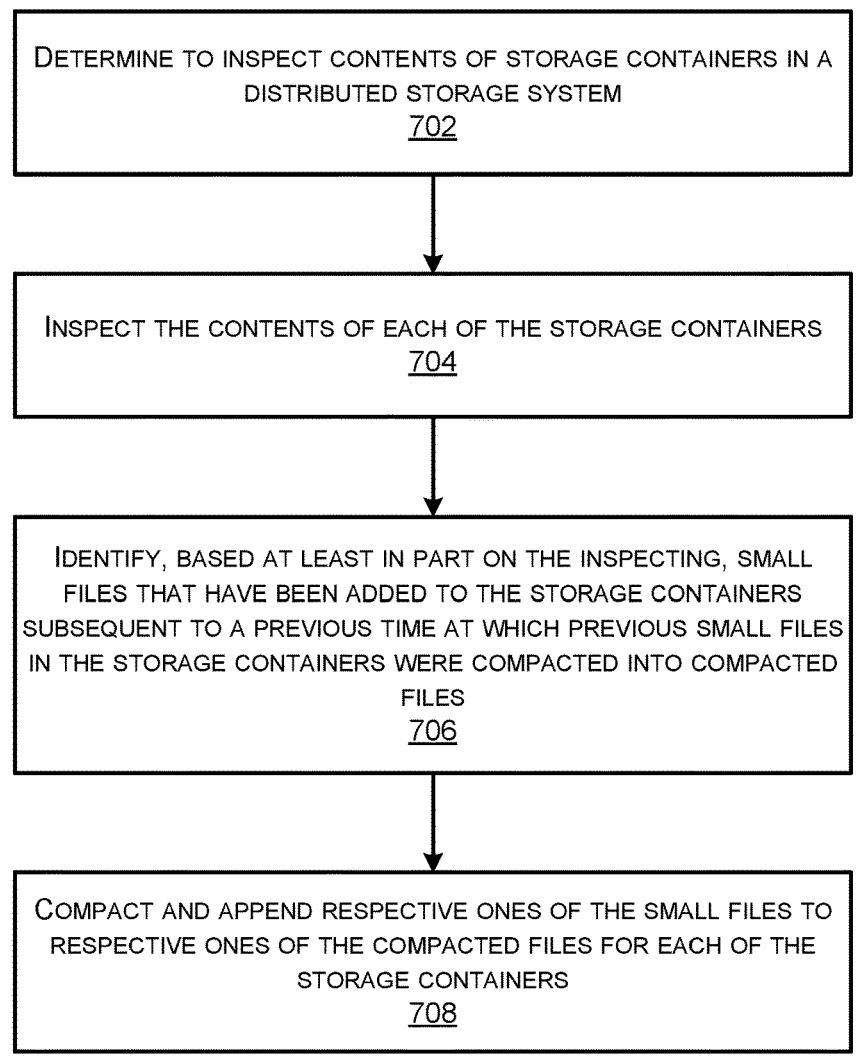
FIG. 7 illustrates a flow diagram of an example method for a file-compaction system controlling a distributed system of components to identify small files in storage containers of a distributed storage system, and automatically compact the small files into large files.

FIG. 7 illustrates a flow diagram of an example method 700 for a file-compaction system 104 controlling a distributed system of components to identify small files 112 in storage containers 108 of a distributed storage system 106, and automatically compact the small files 112 into large files 114.

At 702, the file-compaction system 104 may determine to inspect contents of storage containers in a distributed storage system. For instance, a scheduler component 210 may trigger inspection according to a predefined schedule (e.g., every minute, every hour, etc.), trigger inspection based on access patterns of users that query or access the data, and/or based on other events.

At 704, the file-compaction system 104 may inspect the contents of each of the storage containers, and at 706, the file-compaction system 104 may identify, based at least in part on the inspecting, small files 112 that have been added to the storage containers 108 subsequent to a previous time at which previous small files 112 in the storage containers 108 were compacted into compacted files.

In some instances, in response to determining to inspect the contents of the storage containers 108, the service provider network 102 may scale computing resources to run an inspection component, read, by the inspection component, metadata associated with the storage containers that indicates the small files that have not been compacted, and store the metadata in a location at which a compaction component has access.

At 708, the file-compaction system 104 may compact and append respective ones of the small files 112 to respective ones of the compacted files for each of the storage containers 108.

In some examples, in response to identifying the small files 112, the service provider network 102 may scale computing resources to run a compaction component 214 of the file-compaction system 104, analyze, by the compaction component 214, metadata associated with the containers 108 that indicates the small files 112 that have not been compacted, and determine, by the compaction component 214 and using the metadata, to compact and append the respective ones of the small files 112 to the respective ones of the compacted files.

Figure 8:
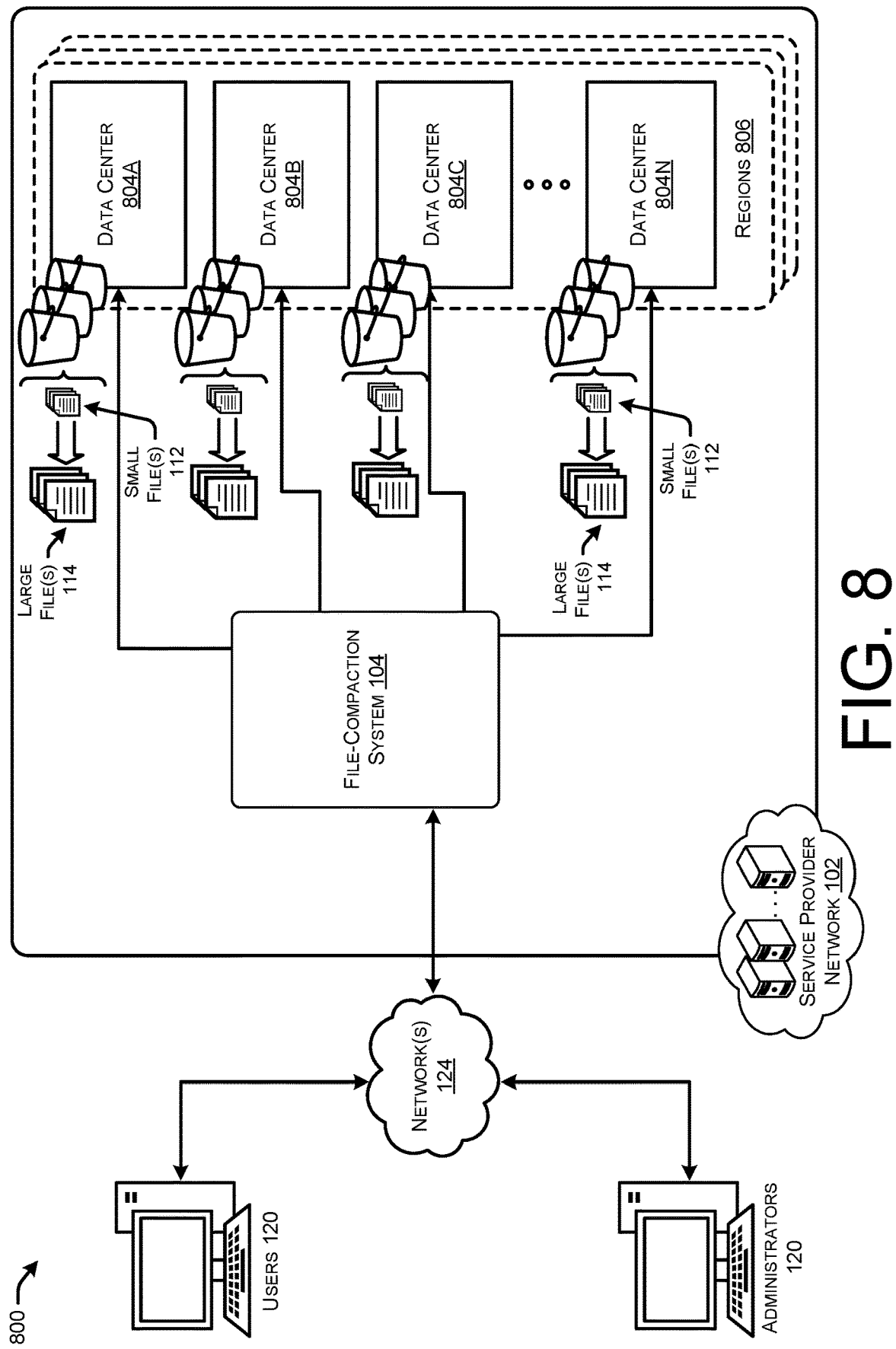
FIG. 8 is a system and network diagram that shows an illustrative operating environment that includes data centers of a service provider network that can be configured to implement aspects of the functionality described herein.

FIG. 8 is a system and network diagram 800 that shows an illustrative operating environment that includes data centers 804 in one or more regions 806 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations, or regions 808. One illustrative embodiment for a data center 804 that can be utilized to implement the technologies disclosed herein will be described below with regard to FIG. 9.

The users 120, such as administrators 120, of the user devices 108 that utilize the service provider network 102 may access the computing resources provided by the service provider network 102 over any wired and/or wireless network(s) 124, which can be a wide area communication network ("WAN"), such as the Internet, an intranet or an Internet service provider ("ISP") network or a combination of such networks. For example, and without limitation, a user device operated by a user 120 of the service provider network 102 may be utilized to access the service provider network 102 by way of the network(s) 124. It should be appreciated that a local-area network ("LAN"), the Internet, or any other networking topology known in the art that connects the data centers 804 to remote clients and other users can be utilized. It should also be appreciated that combinations of such networks can also be utilized.

Figure 9:
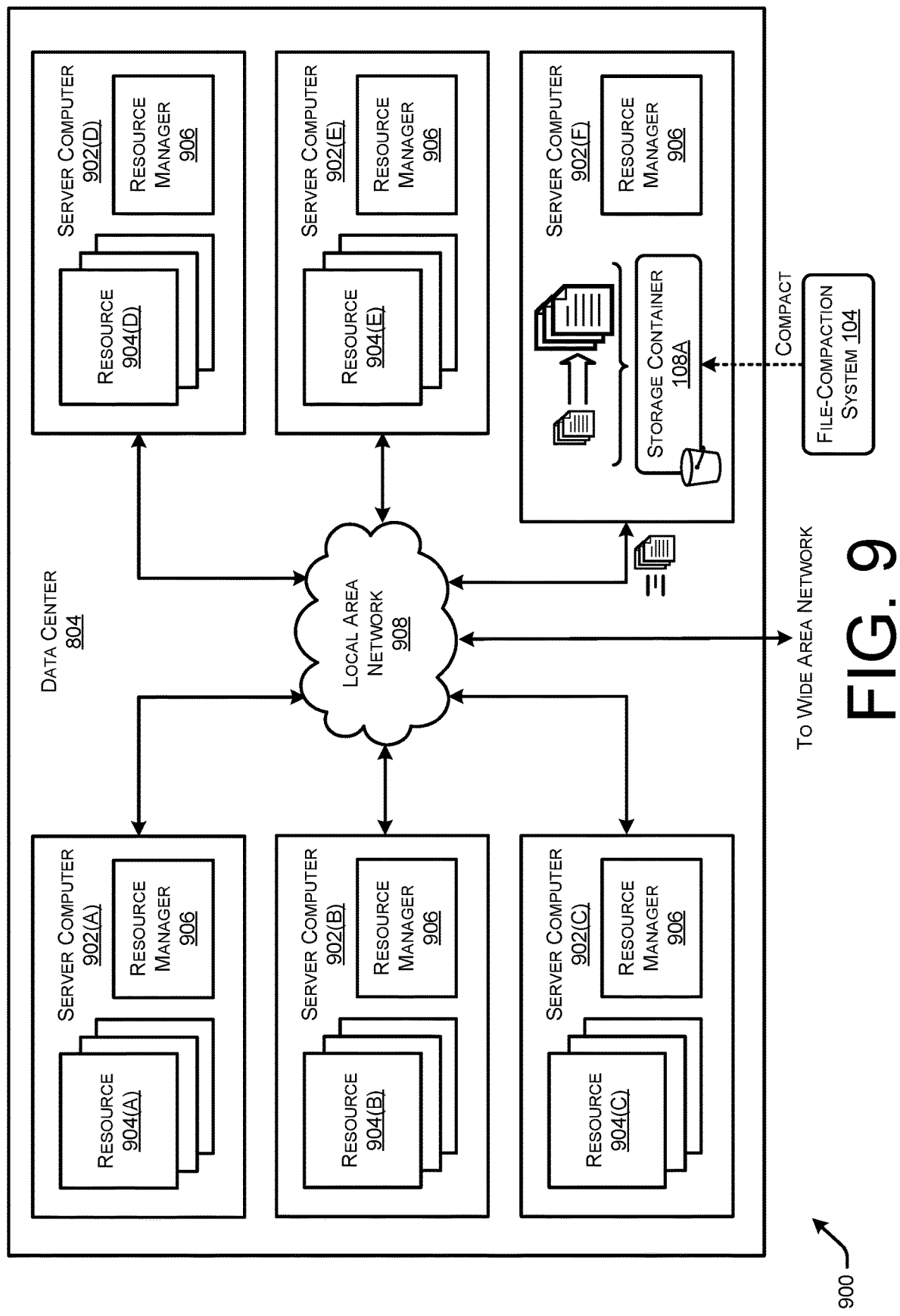
FIG. 9 is a computing system diagram illustrating a configuration for a data center that can be utilized to implement aspects of the technologies disclosed herein.

FIG. 9 is a computing system diagram 900 that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing devices described herein.

The server computers 902 can be standard tower, rack-mount, or blade server computers configured appropriately for providing the computing resources described herein (illustrated in FIG. 9 as the computing resources 904A-904E). As mentioned above, the computing resources provided by the service provider network 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 804 can also be configured to provide network services and other types of services.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

Figure 10:
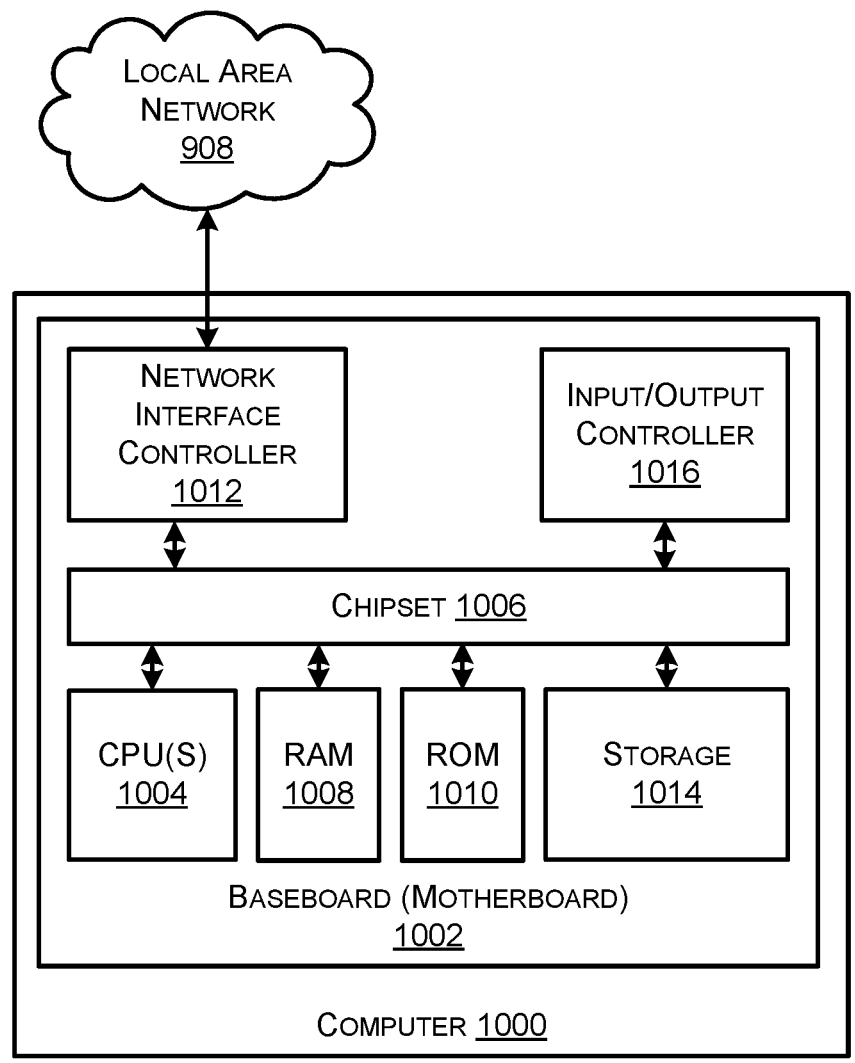
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a network interface controller (NIC) 1012, such as a gigabit Ethernet adapter. The NIC 1012 is capable of connecting the computer 1000 to other computing devices over the network 908 (or 84). It should be appreciated that multiple NICs 1012 can be present in the computer 1000, connecting the computer to other types of networks and remote computer systems.

The computer 1000 can include storage 1014 (e.g., disk) that provides non-volatile storage for the computer. The storage 1014 can consist of one or more physical storage units. The storage 1014 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage 1014 by detecting the physical states or characteristics of one or more particular locations within the physical storage units.

In addition to the storage 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components included therein, may be supported by one or more devices similar to computer 1000. Stated otherwise, some or all of the operations performed by the service provider network 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1014 can store an operating system utilized to control the operation of the computer 1000. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1014 can store other system or application programs and data utilized by the computer 1000.

In one embodiment, the storage 1014, RAM 1008, ROM 1010, and/or other computer-readable storage media may be encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various techniques described above. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A file-compaction system that compacts files stored in a distributed storage system, the file-compaction system comprising:
   one or more processors; and
   one or more computer-readable media storing computer-executable instructions that, when executed by the one or more processors, cause a scheduler component to perform first operations, an inspection component to perform second operations, and a compaction component to perform third operations:
   the first operations performed by the scheduler component comprising:
      detecting an event indicating that the inspection component is to inspect contents of a first storage container and a second storage container of the distributed storage system; and
      instructing the inspection component to inspect the contents of the first and second storage containers;

the second operations performed by the inspection component comprising:
identifying a first small file that has been added to the first storage container subsequent to a first previous time at which first small files in the first storage container were compacted into a first compacted file;
identifying a second small file that has been added to the second storage container subsequent to a second previous time at which second small files in the second storage container were compacted into a second compacted file; and
instructing the compaction component to compact files in the first and second storage containers; and
the third operations performed by the compaction component comprising:
compacting, at the first previous time, the first small files into the first compacted file, wherein the first compacted file requires less memory to store than the first small files;
compacting, at the second previous time, the second small files into the second compacted file, wherein the second compacted file requires less memory to store than the second small files;
analyzing an access pattern according to which a user account accesses data in the distributed storage system;
predicting, using the access pattern, a future time at which the user account is likely to access the data in the distributed storage system;
determining to compact and append at least one of: the first small file or the second small file, at a time prior to the future time;
compacting and appending the first small file to the first compacted file such that the first small file requires less memory to store after being compacted and appended to the first compacted file;
compacting and appending the second small file to the second compacted file such that the second small file requires less memory to store after being compacted and appended to the second compacted file;
receiving, from the user account, a query request for data included in the first compacted file; and
providing the user account with access to the data in the first compacted file.

2. The file-compaction system of claim 1, wherein the third operations performed by the compaction component further comprise:
determining an optimal file size for compacted files stored in the first storage container;
determining that a size of the first compacted file corresponds to the optimal file size; and
compacting subsequent small files added to the first storage container into a third compacted file.

3. The file-compaction system of claim 1, wherein the third operations performed by the compaction component further comprise:
subsequent to compacting and appending the first small file to the first compacted file, deleting the first small file from the first storage container; and
subsequent to compacting and appending the second small file to the second compacted file, deleting the second small file from the second storage container.

4. The file-compaction system of claim 1, wherein:
the file-compaction system is included in a service provider network;
the distributed storage system is included in a data lake managed by the service provider network; and
the service provider network is configured to perform fourth operations comprising:
exposing a data catalogue to the user account associated with data in the first and second compacted files, the data catalogue including references to the data,
wherein the query request is received via the data catalogue.

5. A computer-implemented method performed at least partly by a file-compaction system, the computer-implemented method comprising:
determining that the file-compaction system is to inspect contents of a storage container in a distributed storage system;
inspecting the contents of the storage container;
compacting, at a previous time, small files in the storage container into a compacted file, wherein the small files are stored using less memory after being compacted into the compacted file;
identifying, based at least in part on the inspecting, a small file that has been added to the storage container subsequent to the previous time at which the small files in the storage container were compacted into the compacted file;
analyzing an access pattern according to which a user account accesses data in the distributed storage system;
predicting, using the access pattern, a future time at which the user account is likely to access the data in the distributed storage system;
determining to compact and append the small file at a time prior to the future time;
compacting and appending the small file to the compacted file such that the small file is stored using less memory after being compacted and appended to the compacted file;
generating metadata that describes data in the compacted file, wherein the metadata is configured for processing by applications to optimize read performance of the compacted file; and
providing the metadata to an application that submitted a query request for the data included in the compacted file.

6. The computer-implemented method of claim 5, further comprising:
determining an optimal file size for compacted files stored in the storage container;
determining that a size of the compacted file corresponds to the optimal file size; and
compacting subsequent small files added to the storage container into a different compacted file.

7. The computer-implemented method of claim 5, further comprising:
determining an optimal file size for files stored in the storage container; and
determining that appending the small file to the compacted file would result in the compacted file being of a size that is less than the optimal file size,
wherein the small file is compacted and appended to the compacted file based at least in part on the compacted file being of the size that is less than the optimal file size.

8. The computer-implemented method of claim 5, further comprising:
subsequent to compressing and appending the small file to the compacted file, deleting the small file from the storage container.

9. The computer-implemented method of claim 5, wherein:
the file-compaction system is included in a service provider network; and
the distributed storage system is included in a data lake managed by the service provider network;
further comprising:
exposing a data catalogue to the user account associated with data in the compacted file, the data catalogue including references to the data;
receiving, via the data catalogue and from the user account, a query request for a portion of the data included in the compacted file; and
providing the user account with access to the portion of the data in the compacted file.

10. The computer-implemented method of claim 5, further comprising:
identifying first metadata encoded into the small file that describes data in the small file, wherein the first metadata is to be processed before the data in the small file is read; and
modifying second metadata encoded into the compacted file such that at least a portion of the second metadata describes the data in the small file.

11. The computer-implemented method of claim 5, further comprising:
reading, by an inspection component of the file-compaction system, metadata associated with the storage container that indicates:
the small files in the storage container that have already been compacted; and
the small file that has not been compacted; and
providing the metadata to a compaction component that compacts and appends the small file to the compacted file.

12. The computer-implemented method of claim 5, further comprising:
querying, by an inspection component of the file-compaction system, an inspection configuration file that indicates:
the storage container that is to be inspected; and
a file format of the storage container;
wherein the small file was identified by the inspection component at least partly using the inspection configuration file.

13. The computer-implemented method of claim 5, further comprising:
querying, by a compaction component of the file-compaction system, a compaction configuration file that indicates:
a file identifier for the small file in the storage container that has not been compacted; and
an optimal size for compacted files stored in the storage container,
wherein the small file was compacted and appended by the compaction component at least partly using the compaction configuration file.

14. A file-compaction system comprising:
one or more processors; and
one or more computer-readable media storing computer-executable instructions that, when executed by the one or more processors, cause the one or more processors to perform operations comprising:
compacting, at a previous time, previous small files in a storage container in a distributed storage system into a compacted file, wherein the previous small files are stored using less memory after being compacted into the compacted file;
identifying, based at least in part on inspecting contents of the storage container, small files that have been added to the storage container subsequent to the previous time at which the previous small files in the storage container were compacted into the compacted file;
analyzing an access pattern according to which a user account accesses data in the distributed storage system;
predicting, using the access pattern, a future time at which the user account is likely to access the data in the distributed storage system;
determining to compact and append the small files at a time prior to the future time;
compacting and appending respective ones of the small files to the compacted file respective such that the small files are stored using less memory after being compacted and appended to the compacted file.

15. The file-compaction system of claim 14, wherein:
the file-compaction system is included in a service provider network; and
the distributed storage system is included in a data lake managed by the service provider network;
the operations further comprising:
exposing a data catalogue to the user account associated with data in the compacted file, the data catalogue including references to the data; and
receiving, via the data catalogue and from the user account, a query request for the data included in the compacted file.

16. The file-compaction system of claim 14, the file-compaction system and the distributed storage system are included in a service provider network,
the operations further comprising:
scaling computing resources of the service provider network to run an inspection component of the file-compaction system; and
reading, by the inspection component, metadata associated with the storage container that indicates the small files that have not been compacted; and
storing the metadata in a location at which a compaction component has access.

17. The file-compaction system of claim 14, the file-compaction system and the distributed storage system are included in a service provider network, the operations further comprising:
in response to identifying the small files, scaling computing resources of the service provider network to run a compaction component of the file-compaction system;
analyzing, by the compaction component, metadata associated with the storage container that indicates the small files that have not been compacted; and
determining, by the compaction component and using the metadata, to compact and append the respective ones of the small files to the compacted file.

18. The file-compaction system of claim 14, the operations further comprising:
subsequent to compressing and appending the small files to the compacted file, deleting the small files from the storage container.

19. The file-compaction system of claim 14, the operations further comprising:
determining an optimal file size for files stored in the storage container;
determining that a size of the compacted file of the storage container corresponds to the optimal file size; and compacting subsequent small files added to the storage container into a different compacted file.

20. The file-compaction system of claim 14, the operations further comprising:
    determining an optimal file size for files stored in the storage container; and
    determining that appending a particular small file to the compacted file of the storage container would result in the compacted file being of a size that is less than the optimal file size,
    wherein the particular small file is compacted and appended to the compacted file based at least in part on the compacted file being of the size that is less than the optimal file size.

21. The file-compaction system of claim 14, the operations further comprising:
    determining that a distributed file system that manages the compacted file is configured to manage large files of a target size;
    determining that a size of the compacted file corresponds to the target size; and
    compacting subsequent small files added to the storage container into a different compacted file.

* * * * *